US012576728B2

(12) United States Patent

Montebello et al.

(10) Patent No.: US 12,576,728 B2
(45) Date of Patent: Mar. 17, 2026

(54) METHOD TO CONTROL AN ELECTRIC DRIVE VEHICLE

(71) Applicant: FERRARI S.P.A., Modena (IT)

(72) Inventors: Christian Montebello, Modena (IT); Alessandro Di Blasio, Modena (IT); Antonio Trivisonno, Modena (IT); Ugo Sitta, Modena (IT); Giovanni Lo Calzo, Modena (IT)

(73) Assignee: FERRARI S.P.A., Modena (IT)

( * ) Notice: Subject to any disclaimer, the term of this patent is extended or adjusted under 35 U.S.C. 154(b) by 301 days.

(21) Appl. No.: 18/411,194

(22) Filed: Jan. 12, 2024

(65) Prior Publication Data

US 2024/0239209 A1     Jul. 18, 2024

(30) Foreign Application Priority Data

Jan. 17, 2023     (IT) ........................ 102023000000558

(51) Int. Cl.
*B60L 15/20* (2006.01)
*B60L 50/00* (2019.01)

(52) U.S. Cl.
CPC ........... *B60L 15/2045* (2013.01); *B60L 50/00* (2019.02); *B60L 2240/423* (2013.01); *B60L 2240/427* (2013.01)

(58) Field of Classification Search
None
See application file for complete search history.

(56) References Cited

U.S. PATENT DOCUMENTS

2014/0121867 A1* 5/2014 Tamai .................. B60W 10/08
                                                180/65.265
2020/0381928 A1* 12/2020 Isaksson ............. H01M 10/658

FOREIGN PATENT DOCUMENTS

DE        102020216248 A1     6/2022
WO           9305977 A1     4/1993

OTHER PUBLICATIONS

Italian Search Report for Application No. 20230000058; Filing Date: Jan. 17, 2023; Date of Mailing: Jul. 28, 2023; 10 pages.

* cited by examiner

*Primary Examiner* — Anshul Sood
*Assistant Examiner* — Wenyuan Yang
(74) *Attorney, Agent, or Firm* — CANTOR COLBURN LLP

(57) ABSTRACT

A method to control an electric drive vehicle having at least one electric motor and an electronic power converter provided with at least two power modules, which are connected to one another in parallel to power the electric motor together. The control method provides for the steps of: determining an intensity of an electric current to be supplied by the electronic power converter to the electric motor; comparing the desired intensity of the electric current with a threshold value; and always using both power modules to supply the electric current to the electric motor, if the desired intensity of the electric current exceeds the threshold value.

14 Claims, 3 Drawing Sheets

METHOD TO CONTROL AN ELECTRIC DRIVE VEHICLE

CROSS-REFERENCE TO RELATED APPLICATIONS

This patent application claims priority from Italian patent application no. 102023000000558 filed on Jan. 17, 2023, the entire disclosure of which is incorporated herein by reference.

TECHNICAL FIELD

The present invention relates to a method to control an electric drive vehicle.

PRIOR ART

An electric drive vehicle can be provided with only one or more electric motors (and in this case the drive is exclusively electric) or can be provided with one or more electric motors in combination with a thermal engine (and in this case the drive can be exclusively electric, exclusively thermal or also hybrid).

The electric motor (or each electric motor) is mechanically connected to the drive wheels and is electrically connected to an electric energy storage system through the interposition of an electronic power converter (namely, an inverter) which performs the conversion of the electric energy from direct (on the side connected to the storage system) to alternating (on the side connected to the electric motor) and vice versa. When the (maximum) rated power of electric motor is particularly high (indicatively greater than 200 kW), the electronic power converter preferably comprises (at least) two modules which are connected to one another in parallel.

Patent application US2014121867A1 describes a method to control a hybrid powertrain with multiple electric motors to reduce the total electrical power losses. The control method provides for determining a first electrical power loss value in the operation of a first and of a second electric machine with the power inverters of both electric machines in an active mode, a second electrical power loss value in the operation with the power inverter of the first electric machine in an active mode and the power inverter of the second electric machine in a standby mode, and a third electrical power loss value in the operation with the power inverter of the second electric machine in an active mode and the power inverter of the first electric machine in a standby mode; a controller sets the power inverters in the operation that has the lowest electrical power loss.

Patent application DE102020216248A1 describes a method to control an at least partially electric drive vehicle provided with two electric machines mechanically connected to a same output shaft.

DESCRIPTION OF THE INVENTION

The object of the present invention is to provide a method to control an electric drive vehicle which allows maximizing in every operating condition the energy efficiency of the electric/electronic components (namely, allows reducing in every operating condition the power losses which take place in the electric/electronic components.

According to the present invention, a method to control an electric drive vehicle is provided, according to what claimed by the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting example embodiment thereof, wherein.

PREFERRED EMBODIMENTS OF THE INVENTION

Figure 1:
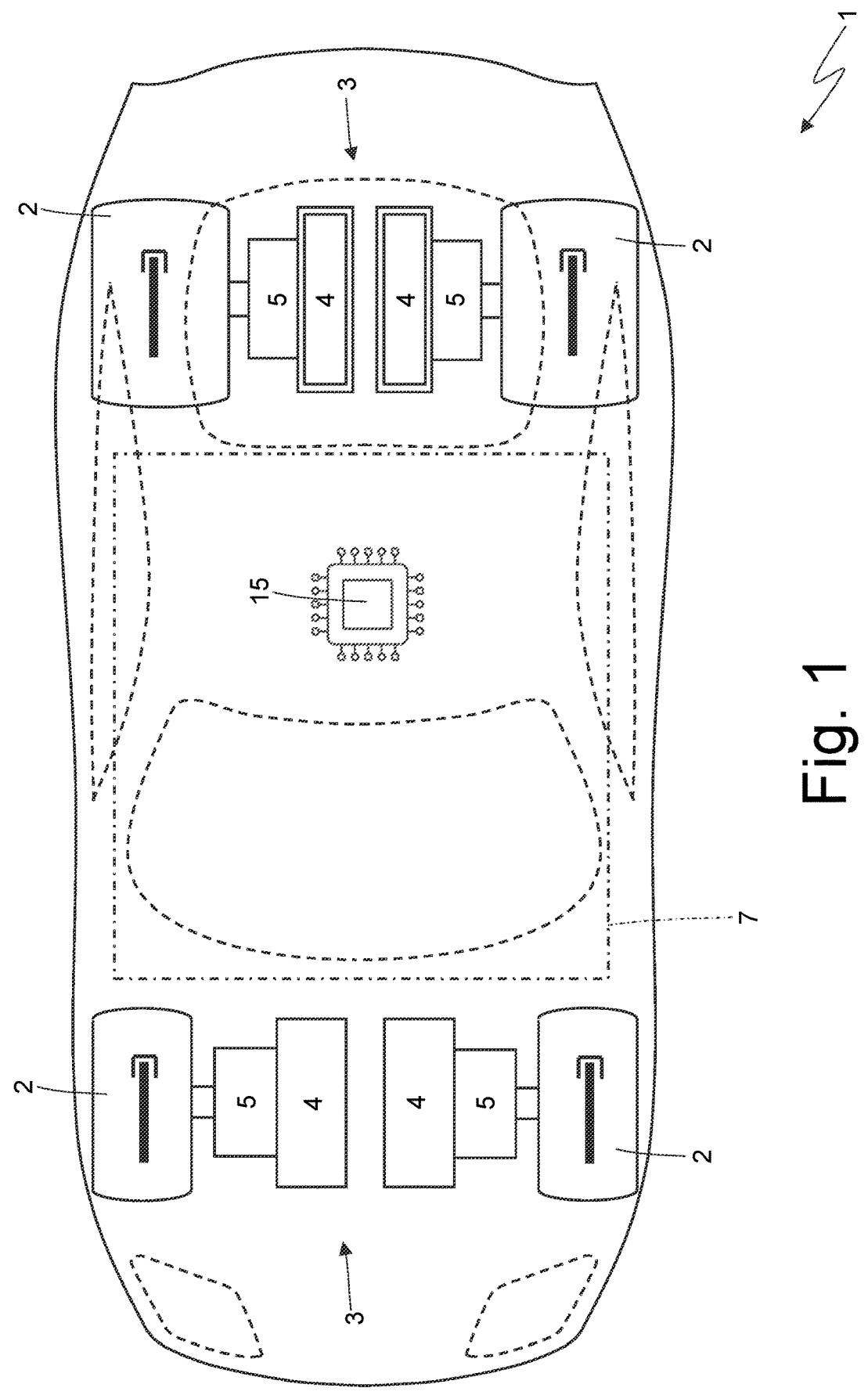
FIG. 1 is a schematic plan view of a vehicle with electric propulsion.

In FIG. 1, reference numeral 1 indicates, as a whole, a vehicle with electric propulsion provided with four drive wheels 2 (two front drive wheels 2 and two rear drive wheels 2).

The vehicle 1 comprises an electric powertrain system 3 arranged in a front position (namely, is connected to the two front drive wheels 2) and an electric powertrain system 3 which is arranged in a rear position (namely, is connected to the two rear drive wheels 2), is structurally identical to the electric powertrain system 3 arranged in a front position, and is mechanically independent of and separate from the electric powertrain system 3 arranged in a front position.

According to a different embodiment not illustrated, the vehicle 1 comprises one single electric powertrain system 3 (arranged in a front position or arranged in a rear position) and thus has only two drive wheels 2; in this embodiment, the vehicle 1 could also comprise a thermal powertrain system (not illustrated) connected to the drive wheels 2 which do not receive the motion from the electric powertrain system 3 and the thermal powertrain system could be provided with a further electric motor (not illustrated) connected to the drive shaft of an internal combustion heat engine.

Each electric powertrain system 3 comprises a pair of reversible electric motors 4 (i.e. that can operate both as electric motor absorbing electric energy and generating a mechanical torque, and as electric generator absorbing mechanical energy and generating electric energy) provided with respective shafts and a pair of transmissions 5 which connect the electric motors 4 (namely, the shafts of the electric motors 4) to the corresponding drive wheels 2 without the interposition of any friction.

Figure 2:
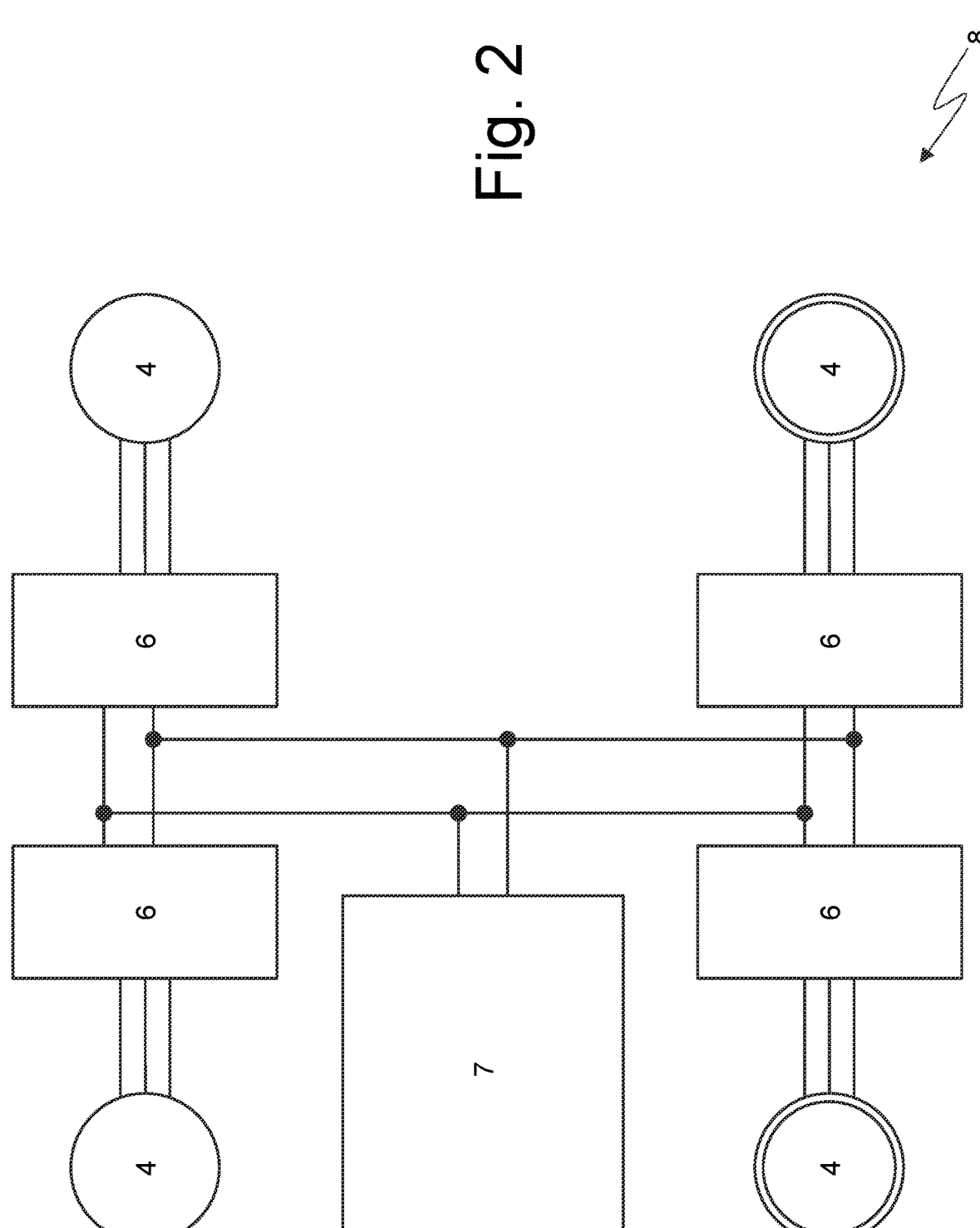
FIG. 2 is a schematic view of a high voltage electrical system of the vehicle of FIG. 1.

According to what is illustrated in FIG. 2, each electric motor 4 is driven by an AC/DC electronic power converter 6 (i.e. an inverter) which is connected to an electric energy storage system 7 provided with chemical batteries; namely, each electronic power converter 6 is bidirectional and comprises a DC side connected to the electric energy storage system 7 and a three-phase AC side which is connected to an electric motor 4.

According to what is illustrated in FIG. 2, a high voltage electrical system 8 of the vehicle 1 comprises four electronic power converters 6 which are structurally identical to one another and each power a respective electric motor 4.

Figure 3:
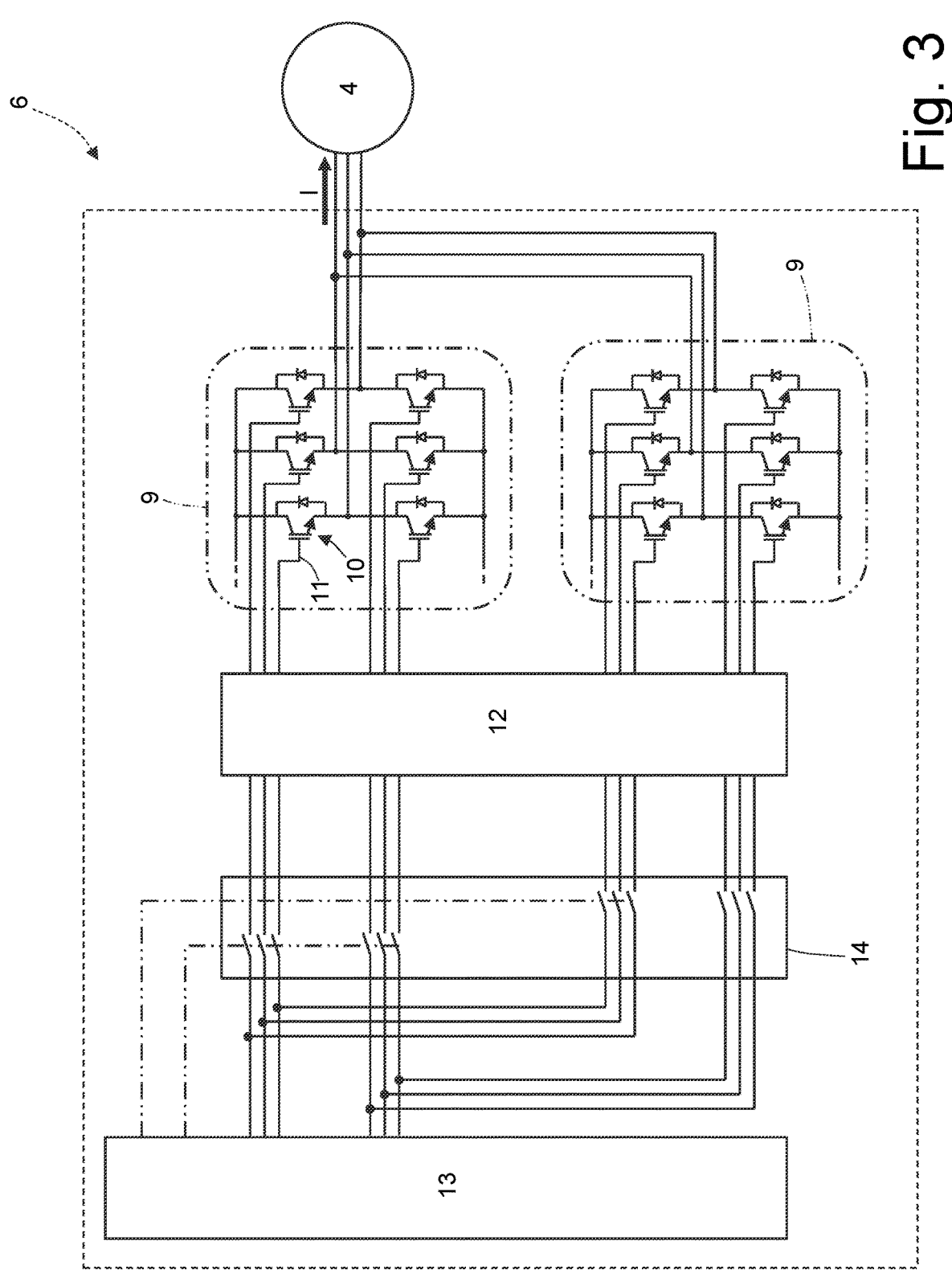
FIG. 3 is a schematic view of a single electronic power converter of the high voltage electrical system of FIG. 2.

According to what is illustrated in FIG. 3, each (indifferently front or rear) electronic power converter 6 comprises two twin power modules 9 (namely, identical to one another), each of which is adapted to power in alternating current the three phases of a corresponding electric motor 4.

Each power module 9 is provided with respective transistors 10 each having a gate 11; obviously, the wiring diagram of a power module 9 illustrated in FIG. 3 is only one possible non-limiting example and thus the power modules 9 could have any other wiring diagram (without prejudice to the presence of transistors 10 each having a gate 11).

Each electronic power converter 6 comprises a driving device 12 of the gate which is connected to the gates 11 of the transistors 10 of the power modules 9.

Each electronic power converter 6 comprises a control unit 13 which supervises the operation of the entire electronic power converter 6 and is connected to the driving device 12 of the gate. Namely, there is an electrical (physical) connection between the control unit 13 and the driving device 12 of the gate and there is a further electrical (physical) connection between the driving device 12 of the gate and the power modules 9. In each electronic power converter 6, all the control logic is implemented in the control unit 13 which constitutes the "brain" of the electronic power converter 6; each control unit 13 normally comprises an electronic circuit which is provided with a (at least one) microprocessor.

Between the control unit 13 and the driving device 12 of the gate, an enabling device 14 is interposed which is provided with respective switches which allow, under the control of the control unit 13, connecting or insulating the driving device 12 of the gate to/from the control unit 13. In FIG. 3, the enabling device 14 is illustrated as a physical element separate from the control unit 13, but obviously the enabling device 14 could be a virtual element integrated in the control unit 13.

In use, the control unit 13 is configured to determine an intensity of an electric current I to be supplied by each electronic power converter 6 to the respective electric motor 4 (the electric current I is positive when the electric motor 4 absorbs electric power for generating mechanical power and is negative when the electric motor 4 absorbs mechanical power for generating electric power). Generally, the mechanical torque to be generated/absorbed by each electric motor 4 is determined in advance and thus the desired intensity of the electric current I to be supplied by the respective electronic power converter 6 is calculated depending on the mechanical torque.

Furthermore, the control unit 13 is configured to compare the desired intensity of the electric current I with a threshold value (obviously only the module of the desired intensity of the electric current I is used for the comparison, thus eliminating the mark); the threshold value corresponds to the (maximum) rated current deliverable by each power module 9. If the desired intensity of the electric current I exceeds the threshold value, then the control unit 13 always uses both power modules 9 to supply the electric current I to the electric motor 4; in fact, one single power module 9 is not capable of delivering on its own an electric current I exceeding the threshold value and it is thus necessary to use both power modules 9 if the desired intensity of the electric current I exceeds the threshold value.

Whereas, only if the desired intensity of the electric current I is smaller than the threshold value, the control unit 13 is configured to estimate a first total power loss in the power modules 9 using one single power module 9 to supply the electric current I to the electric motor 4 and, simultaneously, to estimate a second total power loss in the power modules 9 using both power modules 9 to supply the electric current I to the electric motor 4. Therefore, only if the desired intensity of the electric current I is smaller than the threshold value, the control unit 13 is configured to use both power modules 9 to supply the electric current I to the electric motor 4 if the second power loss (with two active power modules 9) is smaller than the first power loss (with one single active power module 9) and to use one single power module 9 to supply the electric current I to the electric motor 4 if the second power loss (with two active power modules 9) is greater than the first power loss (with one single active power module 9).

According to a preferred embodiment, the control unit 13 estimates the total power loss in the power modules 9 mainly depending on the desired intensity of the electric current I to be supplied by the electronic power converter 6 to the electric motor 4 and possibly also depending on a temperature of the power modules 9, on an electric DC supply voltage (which varies upon the varying of the charge state of the storage system 7), and/or on a control frequency of the power modules 9.

According to a preferred embodiment, the control unit 13 cyclically switches the active power module 9 when one single power module 9 is used to supply the electric current I to the electric motor 4; in this manner, the wear and especially the heating are divided on both power modules 9 reducing the average working temperature of the power modules 9 to the full advantage of the efficiency (which decreases upon the increase in the temperature due to the increase in the electrical resistivity of the materials, and thus to the power losses by Joule effect, upon the increase in the temperature). Since the heating of the power modules 9 is a relatively slow phenomenon, the cyclical switching of the active power module 9 can take place with a relatively slow frequency (for example a switching every 30-60-90 or more seconds).

According to a possible embodiment, the control unit 13 uses a map (table) to estimate the total power loss in the power modules 9. In alternative, the control unit 13 uses a mathematical model to estimate the total power loss in the power modules 9.

According to what is illustrated in FIG. 1, the vehicle 1 comprises a control unit 15 which is configured to determine the mechanical torque to be generated/absorbed by each electric motor 4 and thus establishes the objective to be pursued by each electronic power converter 6 (namely, the control unit 15 is hierarchically greater than the control units 13 of the single electronic power converters 6 for which it establishes the objectives).

In use, the control unit 15 is configured to determine a desired torque to be totally generated by the front and rear electric motors 4 (the desired torque is positive when the electric motors 4 absorb electric power for generating mechanical torque so as to accelerate the vehicle 1 and is negative when the electric motors 4 absorb mechanical power for generating electric power so as to brake the vehicle 1).

Furthermore, the control unit 15 is configured to compare the desired torque with a threshold value (obviously, only the module of the desired torque is used for the comparison thus eliminating the mark); the threshold value corresponds to the (maximum) desired rated torque deliverable by each axle (namely, by the front axle in which the two front electric motors 4 are installed and by the rear axle in which the two rear electric motors 4 are installed). If the desired torque exceeds the threshold value, then the control unit 13 always uses both axles (namely, the two front electric motors 4 and the two rear electric motors 4) for generating the desired torque; in fact, an (a front or rear) axle is not capable of generating on its own a desired torque exceeding the threshold value and it is thus necessary to use both axles (namely, the two front electric motors 4 and the two rear electric motors 4) if the desired torque exceeds the threshold value.

Whereas, only if the desired torque is smaller than the threshold value, the control unit 15 is configured to estimate a first total power loss in the electric motors 4 using one single axle (namely, only the two front electric motors 4 or only the two rear electric motors 4) for generating the torque and, simultaneously, for estimating a second total power loss in the electric motors 4 using both axles (namely, the two front electric motors 4 and the two rear electric motors 4) for generating the torque. Therefore, only if the torque is smaller than the threshold value, the control unit 15 is configured to use both axles (namely, the two front electric motors 4 and the two rear electric motors 4) for generating the torque if the second power loss (with the two active axles) is smaller than the first power loss (with one single active axle) and to use one single axle (namely, the two front electric motors 4 or the two rear electric motors 4) for generating the torque if the second power loss (with two active axles) is greater than the first power loss (with one single active axle).

According to a preferred embodiment, the control unit 13 cyclically switches the active axle when one single axle is used for generating the torque; in this manner, the wear and especially the heating are divided on both axles reducing the average working temperature of the electric motors 4 and of the electronic power converters 6 to the full advantage of the efficiency (which decreases upon the increase in the temperature due to the increase in the electrical resistivity of the materials, and thus to the power losses by Joule effect, upon the increase in the temperature). Since the heating of the electric motors 4 and of the electronic power converters 6 is a relatively slow phenomenon, the cyclical switching of the active axle can take place with a relatively slow frequency (for example a switching every 1-3-5 or more minutes).

According to a possible embodiment, the control unit 13 uses a map (table) to estimate the total power loss in the electric motors 4. In alternative, the control unit 13 uses a mathematical model for estimating the total power loss in the electric motors 4.

According to a preferred embodiment, the total power loss in the electric motors 4 comprises both the power loss which takes place inside the electric motors 4, and the power loss which takes place inside the electronic power converters 6 which power the electric motors 4.

The embodiments described herein can be combined with one another without departing from the scope of protection of the present invention.

The above-described control method has numerous advantages.

Firstly, the above-described control method allows maximizing in every operating condition the energy efficiency of the electric/electronic components (namely, allows reducing in every operating condition the power losses which take place in the electric/electronic components). Some simulations have shown that it is possible to save up to 200-300 continuous Watts in some operating conditions.

Furthermore, the above-described control method is easily implementable since it does not require either a great computational power, or a high memory occupation.

LIST OF THE REFERENCE NUMERALS OF THE FIGURES

1 vehicle
2 wheels
3 powertrain system
4 electric motor

6

5 transmission
6 electronic power converter
7 electric energy storage system
8 high voltage electrical system
9 power modules
10 transistor
11 gate
12 driving device
13 control unit
14 enabling device
15 control unit
I electric current

The invention claimed is:

1. A method to control an electric drive vehicle (1) comprising at least one electric motor (4) and an electronic power converter (6) provided with at least two power modules (9), which are connected to one another in parallel to power the electric motor (4) together; the control method comprises the steps of:

determining an intensity of an electric current (I) to be supplied by the electronic power converter (6) to the electric motor (4);

comparing the desired intensity of the electric current (I) with a first threshold value;

always using both power modules (9) to supply the electric current (I) to the electric motor (4), if the desired intensity of the electric current (I) exceeds the first threshold value;

estimating, only if the desired intensity of the electric current (I) is smaller than the first threshold value, a first total power loss in the power modules (9) using one single power module (9) to supply the electric current (I) to the electric motor (4);

estimating, only if the desired intensity of the electric current (I) is smaller than the first threshold value, a second total power loss in the power modules (9) using both power modules (9) to supply the electric current (I) to the electric motor (4);

using both power modules (9) to supply the electric current (I) to the electric motor (4), if the desired intensity of the electric current (I) is smaller than the first threshold value and if the second power loss is smaller than the first power loss; and using one single power module (9) to supply the electric current (I) to the electric motor (4), if the desired intensity of the electric current (I) is smaller than the first threshold value and if the second power loss is greater than the first power loss.

2. The control method according to claim 1, wherein the total power loss in the power modules (9) is estimated depending on the desired intensity of the electric current (I) to be supplied by the electronic power converter (6) to the electric motor (4).

3. The control method according to claim 1, wherein the total power loss in the power modules (9) is also estimated depending on a temperature of the power modules (9).

4. The control method according to claim 1, wherein the total power loss in the power modules (9) is also estimated depending on an electric DC supply voltage.

5. The control method according to claim 1, wherein the total power loss in the power modules (9) is also estimated depending on a control frequency of the power modules (9).

6. The control method according to claim 1 and comprising the further step of cyclically switching the active power module (9), when one single power module (9) is used to supply the electric current (I) to the electric motor (4).

7. The control method according to claim 1, wherein the total power loss in the power modules (9) is estimated by means of a map.

8. The control method according to claim 1, wherein the total power loss in the power modules (9) is estimated by means of a mathematical model.

9. The control method according to claim 1, wherein the electric drive vehicle (1) comprises at least a first electric motor (4) arranged in a front position and at least a second electric motor (4) arranged in a rear position.

10. The control method according to claim 9 and comprising the steps of:

determining a desired torque to be totally generated by the electric motors (4);

comparing the desired torque with a second threshold value; and always using both electric motors (4) to generate the desired torque, if the desired torque exceeds the second threshold value.

11. The control method according to claim 10 and comprising, only if the desired torque is smaller than the second threshold value, the steps of:

estimating a third total power loss in the electric motors (4) using one single electric motor (4) to generate the desired torque;

estimating a fourth total power loss in the electric motors (4) using both electric motors (4) to generate the desired torque;

using both electric motors (4) to generate the desired torque, if the fourth power loss is smaller than the third power loss; and using one single electric motor (4) to generate the desired torque, if the fourth power loss is greater than the third power loss.

12. The control method according to claim 11 and comprising the step of cyclically switching the active electric motor (4), when one single electric motor (4) is used to generate the desired torque.

13. The control method according to claim 11, wherein the total power loss in the electric motors (4) comprises both the power loss taking place inside the electric motors (4) and the power loss taking place inside the electronic power converters (6) powering the electric motors (4).

14. A vehicle (1) comprising:

two front wheels (2);

two rear wheels (2);

at least one electric motor (4); and an electronic power converter (6) provided with at least two power modules (9), which are connected to one another in parallel so as to power the electric motor (4) together and with a control unit (13) configured to implement the control method according to claim 1.

* * * * *